Aug. 6, 1968      R. S. BENBOW      3,395,768
WEIGHING GAMBREL

Filed April 8, 1966      2 Sheets-Sheet 1

INVENTOR.
ROBERT S. BENBOW
BY
Lothrop & West
ATTORNEYS

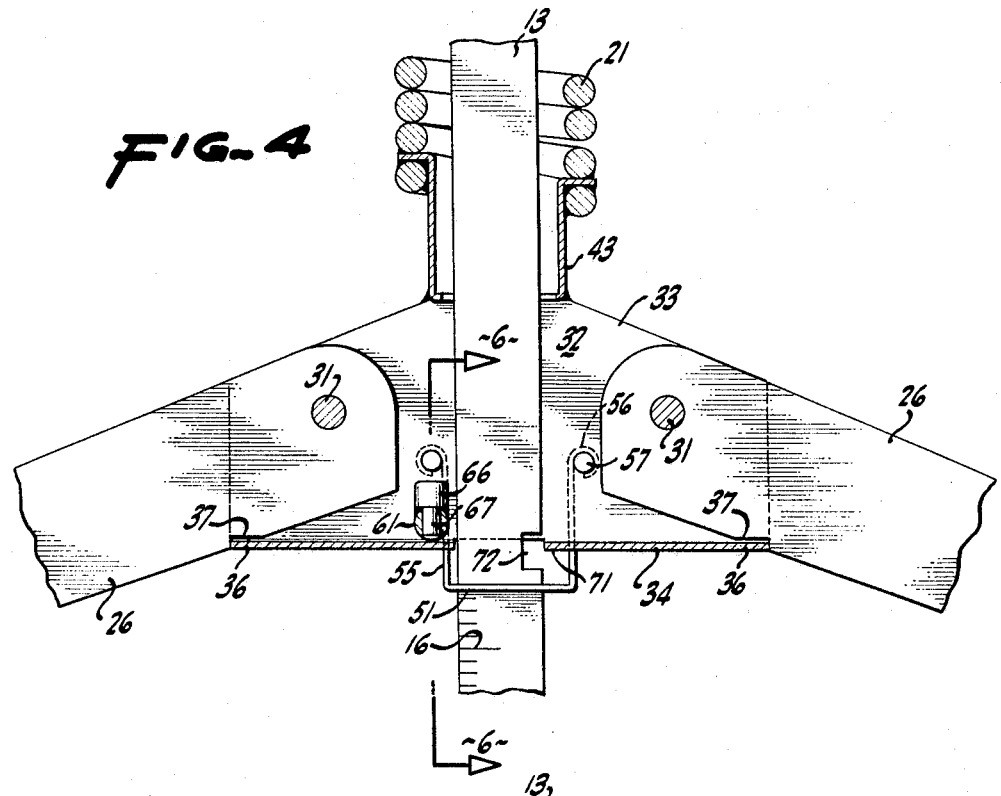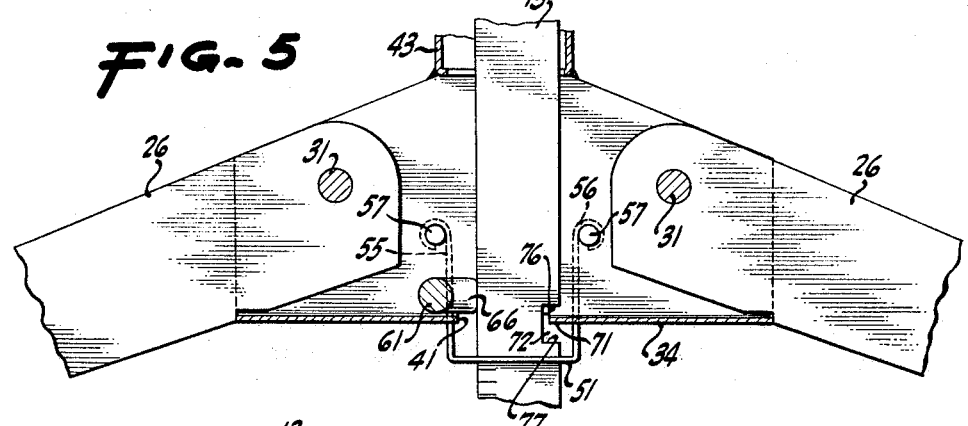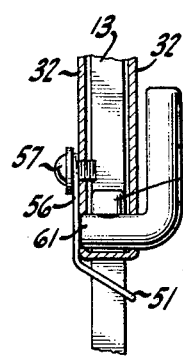
INVENTOR.
ROBERT S. BENBOW
BY
Lothrop & West
ATTORNEYS

United States Patent Office 3,395,768
Patented Aug. 6, 1968

3,395,768
WEIGHING GAMBREL
Robert S. Benbow, Rte. 2, Box 2392,
Oroville, Calif. 95965
Filed Apr. 8, 1966, Ser. No. 541,161
4 Claims. (Cl. 177—225)

ABSTRACT OF THE DISCLOSURE

A stem with weight indicia is vertically suspended from a support member. Vertically movable relative to the stem is a bracket carrying a pair of oppositely extending gambrel arms formed with terminal hooks to engage the legs of a dead animal to be supported and weighed. A tension spring connects the fixed stem and the movable arms, the weight indicia being a function of the spring constant so as to indicate the weight of the animal supported on the gambrel arms. Structure is also provided to immobilize the bracket and attendant arms at a predetermined location.

---

The invention relates to devices for suspending large dead animals, particularly game animals, such as deer, elk and antelope.

At the conclusion of a successful hunt, it becomes necessary promptly to skin and dress the animal, for example, a deer. It is difficult to perform these various operations with the dead animal lying on the ground, and especially if it is of considerable size and weight. Consequently, many hunters lash the spread hind legs of the animal to a horizontal overhead limb or pole, using wire or rope to tie the legs to the horizontal supporting member.

While this expedient serves in a moderately satisfactory manner, the task of tying the two legs to an overhead support is difficult and awkward; and, unless the ropes are secure, the strain exerted by the weight of the animal oftentimes dislodges the ties and the partially skinned and dressed animal falls to the ground.

Furthermore, the arrangement heretofore described affords no way in which the weight of the animal can be determined before and after dressing, these being quantities of great interest to the hunter.

It is therefore an object of the invention to provide a weighing gambrel which readily enables a hunter to suspend a large animal for skinning and dressing.

It is another object of the invention to provide a weighing gambrel which securely supports large game in a posture which is most advantageous to the skinning and dressing operation.

It is still another object of the invention to provide a gambrel which quickly permits a hunter to determine the weight of the animal suspended from the device.

It is a further object of the invention to provide a weighing gambrel which is light in weight and is foldable into compact size for ease in packing and carrying.

It is a yet further object of the invention to provide a weighing gambrel which is relatively economical, yet is rugged, durable and trouble free in use.

It is an additional object of the invention to provide a weighing gambrel which not only lends itself to use by hunters, but also by cattlemen and in slaughterhouses owing to its reliability and versatility.

It is another object of the invention to provide a generally improved weighing gambrel.

Other objects, together with the foregoing, are attained in the embodiment described in the following description and illustrated in the accompanying drawings, in which:

FIGURE 4 is a fragmentary, median, vertical sectional view, to an enlarged scale illustrating the locking lever in inoperative position;

FIGURE 5 is a view similar to FIGURE 4 but with the locking lever in operative position; and FIGURE 6 is a fragmentary sectional view to an enlarged scale, the plane of the section being indicated by the line 6—6 in FIGURE 4.

Figure 2:
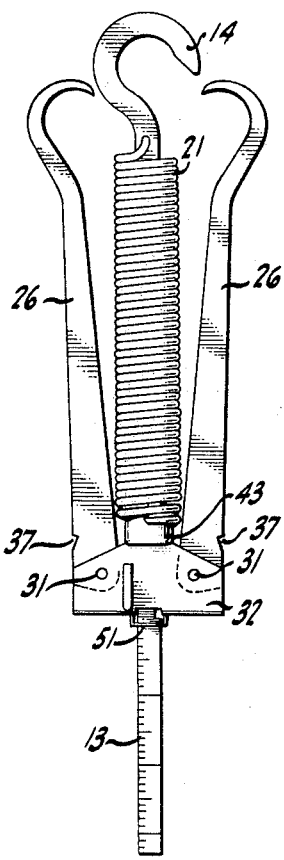
FIGURE 2 is a front elevational view, but with the arms in folded position.

While the invention is susceptible of numerous physical embodiments, depending upon the environment and requirements of use, substantial numbers of the herein shown and described embodiment have been made, sold and used, and all have performed in an eminently satisfactory manner.

The weighing gambrel of the invention, generally designated by the reference numeral 12, includes a vertically elongated stem 13, or rod, surmounted by a hook 14 enabling the device to be supported on any suitable member, such as a sturdy horizontal branch, limb, wire, pipe, rope or block and tackle.

Adjacent the lower portion of the stem, the front side of the stem is provided with suitable indicia 16 (see FIGURE 4) including scalar markings and numerals indicating weight.

The scale markings can be of any appropriate values, depending on the expected weights to be encountered, and could, for example, indicate weights up to three-hundred pounds, or considerably more, if desired.

The indicia 16 are scaled in dependence upon the spring constant of a helical tension spring 21 selected so that it follows, quite closely, Hooke's law.

Hooke's law, as is well known, is a classical statement of elasticity, namely, that within the elastic limits, the stress, or extent of stretch, of an elastic solid, is proportional to the strain, or imposed force, responsible for it.

There is provided at the upper end of the spring 21 a hook 22 projecting through an opening 23 in the stem, thus affording an anchor capable of resisting the downward strain imposed on the spring as the hind legs of the animal are hooked onto a pair of gambrel arms 26.

More specifically, the appropriate joints of the animal's hind legs are hung on the sharp hooks 27 on the distal ends of the arms 26 in the manner customary in butcher shops and slaughterhouses, the body of the animal being thereby suspended to facilitate skinning and dressing.

The arms 26 are pivotally mounted on pins 31 spanning the opposite vertical walls 32 (see FIGURE 3) of a bracket 33. A horizontal bottom wall 34 extends between the bottom ends of the vertical walls 32, the bottom 34 serving not only to strengthen the bracket but also to limit the downward extent of movement of the gambrel arms 26.

Figure 1:
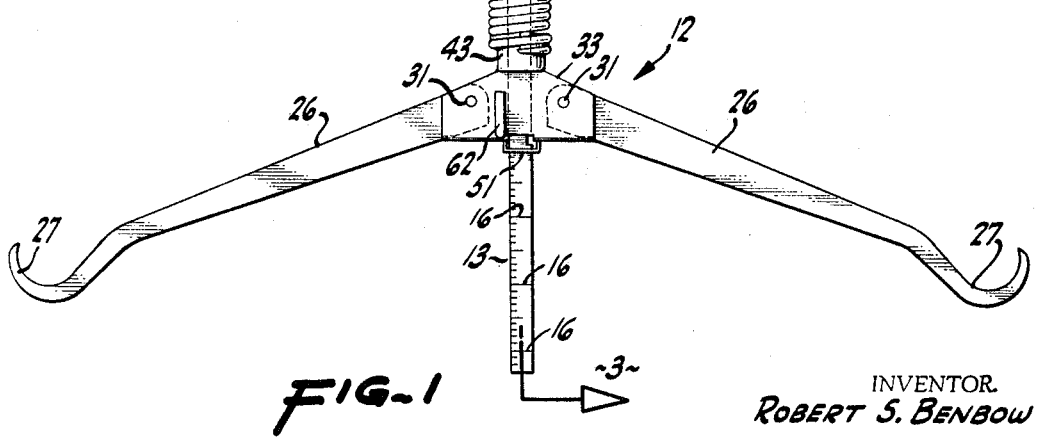
FIGURE 1 is a front elevational view showing the arms in extended position.

In other words, for compactness, the arms 26 can be swung upwardly to the position shown in FIGURE 2; whereas the arms in their operative condition assume the attitude illustrated in FIGURE 1, with the slope being dictated by the interference between the bottom edges of the arms 26 and the opposite lateral ends 36 of the bracket bottom wall 34.

Suitable notches 37 in the bottom edges of the arms register with the wall ends 36 to increase the extent of the bearing surface between the bottom edges of the arms 26 and the bracket wall ends 36.

The central portion of the horizontal bottom wall 34 of the bracket is provided with an opening 41 to accommodate the stem 13, thus enabling the bracket to move upwardly and downwardly relative to the stem as weight is either imposed on or removed from the gambrel arms.

The bracket 33 is secured to the lower coils of the helical spring 21 through an intervening cup-shaped member 43. The bottom wall 44 of the cup is welded to the top of the bracket vertical walls 32 (see FIGURE 3) and the bottom wall 44 of the cup is provided with a central opening 46 to accommodate the stem 13.

One of the major purposes of the cup 43, in addition to affording a secure anchor between the bracket and the lower end of the spring, is the provision of means for adjusting the effective length of the spring.

While, at the time of manufacture the spring constant and the dimensions of the spirng, as well as the tare weight of the vertically movable elements of the gambrel, are held to close tolerances, it has been found desirable to be able to adjust the "free" or effective length of the spring so that the gauge marker 51 truly and accurately registers with the appropriate weight indicia 16 throughout the entire weight range.

The upper portion of the cup, accordingly, is provided with an outwardly projecting helical flange 53 extending through approximately 360° around the upper end portion of the cup, somewhat similar to the external threads on the upper end of a fruit jar which are engageable with an interiorly threaded closure cap.

Figure 3:
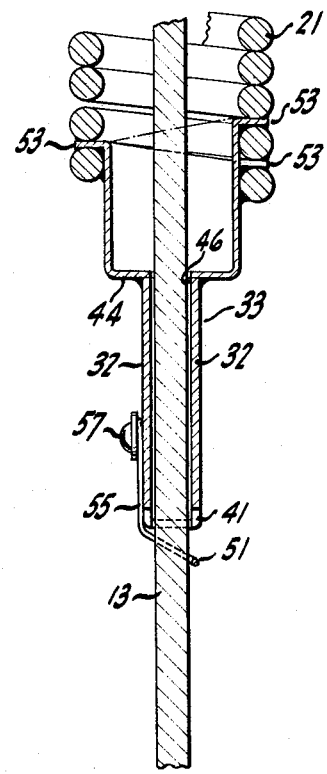
FIGURE 3 is a fragmentary, sectional view, to an enlarged scale, the plane of the section being indicated by the line 3—3 in FIGURE 1.

As appears most clearly in FIGURE 3, the bottom coils or turns of the helical spring 21 are threaded on the helical track provided by the helical flange 53.

When the device is being assembled, at the time of manufacture, the lower end of the spring is threaded on the cup flanges 53. This is followed by inserting the lower end of the stem 13 downwardly through the hollow interior of the spring, through the cup opening 46 and through the bottom bracket opening 41 until the opening 23 adjacent the upper end of the stem 13 is in approximate registry with the upper anchor hook 22 of the spring. The spring hook is thereupon inserted through the opening and the gambrel arms 26 are spread to the operative position, as in FIGURE 1.

In an unloaded condition, the tare weight of the movable elements is ordinarily such that the gauge marker 51 is in registry with the zero weight indicium after assembly is effected.

The gauge marker 51 is, conveniently, a rigid horizontal wire, the ends of which are bent rearwardly and upwardly (see FIGURES 3 and 6) to form a pair of legs 55 curved at their ends into loops 56 secured by sheet metal screws 57 to the bracket rear wall.

It is sometimes desirable to form the loops 56 into an inverted U-shaped configuration to permit the wire member to be shifted bodily upwardly or downwardly at the time of assembly so that the gauge marker portion 51 is located at the zero or base indicium, at which time the screws 57 are tightened. However, this arrangement is accompanied by the risk that should the screws 57 subsequently become loose, the gauge marker 51 could shift to a location giving a false weight reading.

It is consequently preferred, as stated above, to "screw" the bottom coils of the spring 21 onto the cup flanges 53 to a location such that the gauge marker 51 not only gives a zero reading when no external weight is imposed on the arms 26, but it also gives a correct reading throughout the entire range, as ascertained by test loading with external weights of known values.

In the usual case, the extent of engagement of the lower coils of the spring with the cup flanges is approximately as appears most clearly in FIGURES 1 and 3, namely, about one and one-half to two full turns. If necessary, the neck of the spring anchor hook 22 can be slightly bent to accommodate for small variations in the desired effective or "free" length of the spring.

With the device in its FIGURE 1 position, the animal can be secured to the arm hooks 27, as previously explained and the arms and the bracket, being subjected to the strain, are urged downwardly, the movement being, of course, opposed by the stretched spring. A weight reading can then be made.

While it is possible to skin and dress the animal with the spring in its stretched position, it is preferred to immobilize the movable elements as these operations are effected.

I have therefore provided means for locking the bracket, such means including a horizontal shaft 61 (see FIGURES 4–6) journaled in the vertical side walls 32 of the bracket, the shaft 61 being selectively rotated by a lever arm 62 connected to the front end of the shaft and bent at right angles thereto.

Mounted on the shaft 61 is a cam member 66, mounting being effected, for example, by a pin 67 on the cam member, the pin being driven with an interference fit into a radial drilled opening in the shaft.

With the lever arm in the upright attitude shown in FIGURES 1, 4 and 6, the cam head 66 is spaced from the stem 13, thus allowing free relative motion between the stem and the bracket as is required for weighing.

When, however, the lever 62 and the shaft 61 are rotated in a clockwise direction, as would be seen in FIGURE 1, the cam head 66 is swung into engagement with the adjacent edge of the stem, the effect being to urge the portion 71 of the horizontal bracket plate 34 into the recess 72 located on the right hand edge of the stem 13, the sequence being as illustrated in FIGURES 4 and 5.

In other words, with the bracket in locked condition, as appears in FIGURE 5, vertical relative motion between the stem and the bracket is restricted to the vertical dimension of the recess 72, namely the distance between the upper wall 76 and the lower wall 77 of the recess.

After skinning and dressing have been effected, the lever arm, the shaft and the cam head are returned to neutral position by rotating the lever arm, thus releasing the bracket and allowing the hunter to read the dressed weight of the animal.

Ordinarily, at this juncture, the animal is removed from the gambrel. However, where desired, the animal can again be lifted until the slot 72 is in registry with the bottom plate portion 71 of the bracket and the lever arm again rotated clockwise ninety degrees so as to lock the bracket to the stem. In this event, the device, having already performed its weighing function, thereafter serves as a reliable and secure support for the animal awaiting its subsequent disposition.

What is claimed is:
1. A weighing gambrel comprising:
  (a) an elongated stem;
  (b) a bracket slidably disposed on said stem for movement relative thereto;
  (c) an opposed pair of laterally extending arms on said bracket;
  (d) a helical spring connecting said stem and said bracket for biasing said bracket in a direction opposed to the strain imposed on said arms, the stress of said spring being proportional to the strain imposed on said arms, said stem including scale markings indicating the stress of said spring; and,
  (e) means connecting said bracket and said spring for varying the effective length of said spring to position said bracket at the base location of said scale markings.

2. The weighing gambrel as in claim 1 further characterized by means for selectively preventing relative movement between said stem and said bracket.

3. A weighing gambrel comprising:
  (a) an elongated stem;
  (b) a bracket slidably disposed on said stem for movement relative thereto;
  (c) an opposed pair of laterally extending arms on said bracket, said arms being pivotally mounted on said bracket for movement through an arc of approximately ninety degrees and wherein the distal ends of said arms are hook-shaped; and, (d) a helical spring connecting said stem and said bracket for biasing said bracket in a direction opposed to the strain imposed on said arms, the stress of said spring being proportional to the strain imposed on said arms, said stem including scale markings indicating the stress of said spring.

4. A weighing gambrel as in claim 3 wherein said bracket includes an opposed, laterally extending portion capable of interfering with and supporting said arms in their lowermost attitude, with each arm at an angle of approximately twenty degrees below the horizontal.

References Cited

UNITED STATES PATENTS

| 2,129,469 | 9/1938 | Hedges | 177—232 X |
| 2,693,864 | 11/1954 | Ferro | 177—232 X |
| 2,707,950 | 5/1955 | Judovich | 177—225 X |

RICHARD B. WILKINSON, *Primary Examiner.*

GEORGE H. MILLER, JR., *Assistant Examiner.*